(12) United States Patent
Ryu et al.

(10) Patent No.: US 9,889,838 B2
(45) Date of Patent: Feb. 13, 2018

(54) METHOD FOR CONTROLLING OF VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/258,035

(22) Filed: Sep. 7, 2016

(65) Prior Publication Data

US 2017/0167401 A1 Jun. 15, 2017

(30) Foreign Application Priority Data

Dec. 11, 2015 (KR) ........................ 10-2015-0177464

(51) Int. Cl.
 *B60W 10/06* (2006.01)
 *F01L 1/34* (2006.01)
 (Continued)

(52) U.S. Cl.
 CPC ............ *B60W 10/06* (2013.01); *B60W 20/10* (2013.01); *F01L 1/047* (2013.01); *F01L 1/34* (2013.01);
 (Continued)

(58) Field of Classification Search
 CPC ... B60W 10/06; B60W 20/10; F02D 13/0219; F02D 41/0007; F02D 13/0261;
 (Continued)

(56) References Cited

U.S. PATENT DOCUMENTS 5,161,497 A  11/1992 Simko et al.
5,988,125 A * 11/1999 Hara ........................ F01L 1/34
                                                          123/90.16

(Continued)

FOREIGN PATENT DOCUMENTS

JP          H07-42514 A       2/1995
KR        10-0321206 B1       1/2002
KR    10-2009-0013007 A       2/2009

*Primary Examiner* — Joseph Dallo
(74) *Attorney, Agent, or Firm* — Brinks Gilson & Lione

(57) ABSTRACT

A method for controlling valve timing for an engine includes: classifying a plurality of control regions depending on an engine speed and an engine load; applying a maximum duration to an intake valve and controlling an exhaust valve to limit a valve overlap in a first region; controlling the intake valve and the exhaust valve to maintain the maximum duration in a second region; advancing an intake valve closing (IVC) timing and an exhaust valve closing (EVC) timing in a third region; approaching the IVC timing to a bottom dead center (BDC) in a fourth region; controlling a throttle valve to be fully opened, advancing an intake valve opening (IVO) timing before a top dead center (TDC), and controlling the IVC timing to be a predetermined value after the BDC in a fifth region; and controlling the throttle valve to be fully opened and advancing the IVC timing in a sixth region.

12 Claims, 6 Drawing Sheets

(51) Int. Cl.
  *F01L 1/047* (2006.01)
  *F02D 41/00* (2006.01)
  *F02D 13/02* (2006.01)
  *B60W 20/10* (2016.01)
  *F02D 41/14* (2006.01)

(52) U.S. Cl.
  CPC ..... *F02D 13/0219* (2013.01); *F02D 13/0261* (2013.01); *F02D 41/0002* (2013.01); *F02D 41/0007* (2013.01); *F02D 41/1406* (2013.01); *F02D 2041/001* (2013.01); *F02D 2041/002* (2013.01); *F02D 2200/101* (2013.01); *Y02T 10/144* (2013.01); *Y02T 10/18* (2013.01); *Y02T 10/42* (2013.01); *Y10S 903/905* (2013.01)

(58) Field of Classification Search
  CPC ........... F02D 41/0002; F02D 2041/001; F02D 41/1406; F02D 2200/101; F02D 2041/002; F01L 1/34; F01L 1/047; Y10S 903/905
  See application file for complete search history.

(56) References Cited

U.S. PATENT DOCUMENTS

| | | | | |
|---|---|---|---|---|
| 6,125,801 | A * | 10/2000 | Mendler | F01L 1/34 123/48 R |
| 6,408,806 | B2 * | 6/2002 | Sugiyama | F01L 1/34 123/90.12 |
| 6,619,249 | B2 * | 9/2003 | Sakuragi | F01L 1/34 123/198 F |
| 6,647,935 | B2 * | 11/2003 | Aoyama | F01L 1/024 123/198 F |
| 6,659,054 | B2 * | 12/2003 | Sugiyama | F01L 1/022 123/478 |
| 6,792,924 | B2 * | 9/2004 | Aoyama | F01L 1/34 123/197.4 |
| 6,886,532 | B2 * | 5/2005 | Nohara | F01L 1/024 123/184.42 |
| 7,021,277 | B2 * | 4/2006 | Kuo | F02D 13/0215 123/295 |
| 7,840,335 | B2 * | 11/2010 | Akihisa | F02M 26/01 123/48 R |
| 8,322,315 | B2 * | 12/2012 | Akihisa | F02D 13/0261 123/48 C |
| 8,352,157 | B2 * | 1/2013 | Akihisa | F02D 13/0234 123/48 C |
| 8,413,618 | B2 * | 4/2013 | Kamiyama | F02D 13/0261 123/48 B |
| 8,666,640 | B2 * | 3/2014 | Nakatani | F02D 13/0234 123/568.14 |
| 8,695,544 | B2 * | 4/2014 | Sawada | F01L 1/344 123/90.15 |
| 8,983,753 | B2 * | 3/2015 | Rayl | F02D 37/00 701/102 |
| 9,127,601 | B2 * | 9/2015 | Cowgill | F02D 41/0085 |
| 2002/0129780 | A1 * | 9/2002 | Nohara | F01L 1/024 123/90.16 |
| 2003/0106542 | A1 * | 6/2003 | Aoyama | F01L 1/34 123/568.14 |

* cited by examiner

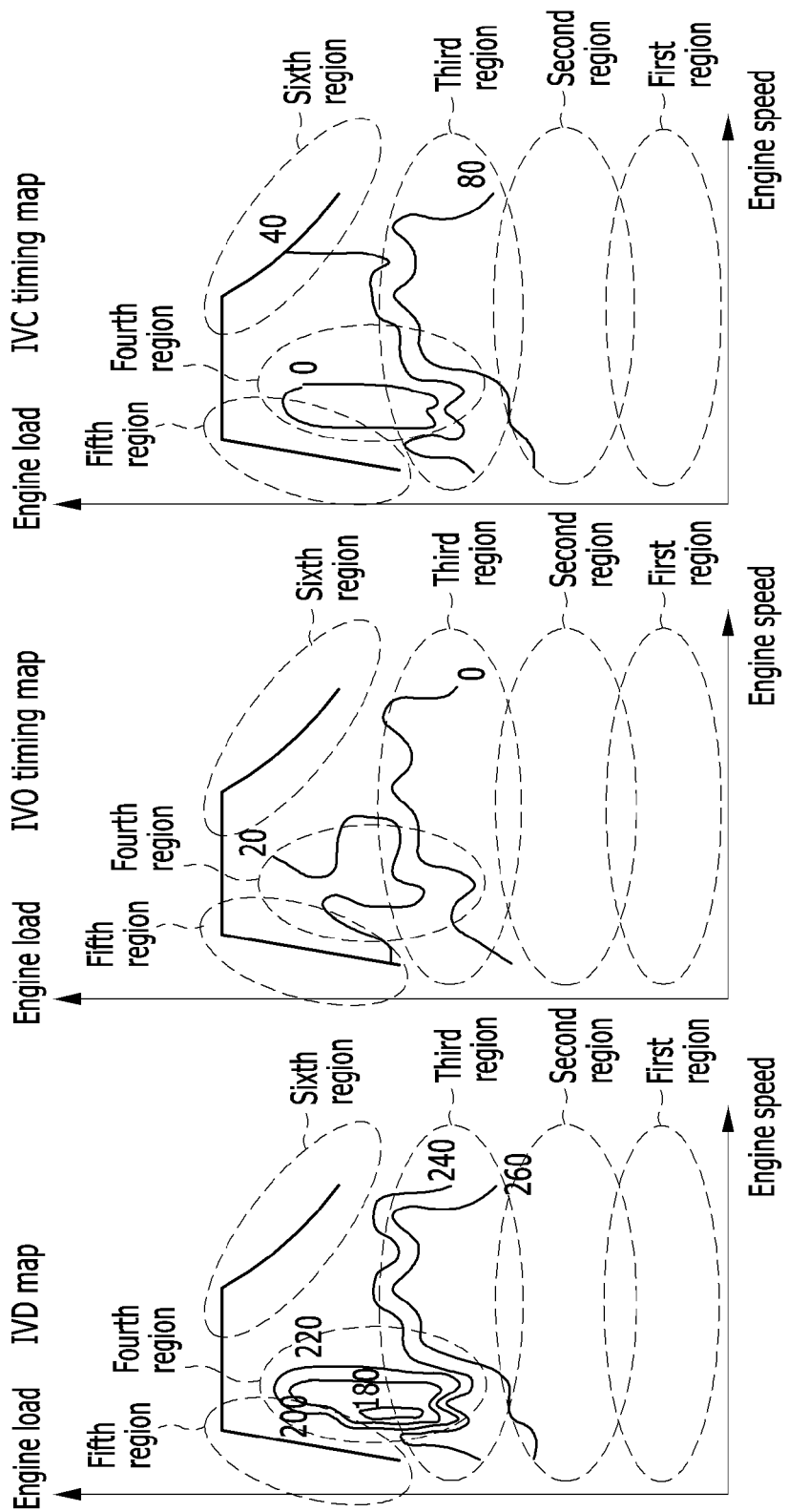

METHOD FOR CONTROLLING OF VALVE TIMING OF CONTINUOUS VARIABLE VALVE DURATION ENGINE

CROSS-REFERENCE TO RELATED APPLICATION

This application claims priority to and the benefit of Korean Patent Application No. 10-2015-0177464, filed on Dec. 11, 2015, the entire contents of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a cylinder by the explosion pressure into rotating motion to actuate an intake valve and an exhaust valve, and while the intake valve is opened, air is suctioned into a combustion chamber, and while an exhaust valve is opened, gas which is com busted in the combustion chamber is exhausted.

To improve the operations of the intake valve and the exhaust valve and thereby improve engine performance, a valve lift and a valve opening/closing time (timing) should be controlled according to a rotational speed or load of an engine. Therefore, a continuous variable valve duration (CVVD) device controlling the opening duration of an intake valve and an exhaust valve of the engine and a continuous variable valve timing (CVVT) device controlling the opening and closing timing of the intake valve and the exhaust valve of the engine have been developed.

The CVVD device may control opening duration of the valves. In addition, the CVVT device may advance or retard the opening or closing timing of the valves in a state that the opening duration of the valve is fixed. That is, if the opening timing of the valve is determined, the closing timing is automatically determined according to the opening duration of the valve.

However, in case of combining the CVVD device and the CVVT device, both the opening duration and timing of the valve should be simultaneously controlled.

The above information disclosed in this Background section is only for enhancement of understanding of the background of the present disclosure and therefore it may contain information that does not form the prior art that is already known to a person of ordinary skill in the art.

SUMMARY

The present disclosure provides a system and a method for controlling valve timing of a continuous variable valve duration engine that simultaneously controls duration and timing of the valve being equipped with a continuous variable valve duration device and a continuous variable valve timing device disposed on an intake valve side and equipped with a continuous variable valve duration device on an exhaust valve side of a turbo engine vehicle by independently controlling an opening and closing timing of an intake valve and an exhaust valve.

One form of the present disclosure provides a method for controlling valve timing of a turbo engine provided with a continuous variable valve duration (CVVD) device and a continuous variable valve timing (CVVT) device at an intake valve side and a continuous variable valve duration (CVVD) device at an exhaust valve side. The method may include: classifying a plurality of control regions depending on an engine speed and an engine load; applying a maximum duration to an intake valve and controlling an exhaust valve to limit a valve overlap in a first region; controlling the intake valve and the exhaust valve to maintain the maximum duration in a second region; advancing an intake valve closing (IVC) timing and an exhaust valve closing (EVC) timing by a predetermined angle in a third region; approaching the IVC timing to a bottom dead center (BDC) in a fourth region; controlling a throttle valve to be fully opened, advancing an intake valve opening (IVO) timing before a top dead center (TDC), and controlling the IVC timing to be a predetermined value after the BDC in a fifth region; and controlling the throttle valve to be fully opened and advancing the IVC timing by a predetermined angle in a sixth region. In particular, the first region includes a region in which an engine load is less than a first predetermined load, the second region includes a region in which the engine load is greater than or equal to the first predetermined load and less than a second predetermined load, the third region includes a region in which the engine load is greater than or equal to the second predetermined load and less than a third predetermined load, the fourth region includes a region in which the engine load is greater than or equal to the second predetermined load and the engine speed is greater than or equal to a first predetermined speed and less than a second predetermined speed, the fifth region includes a region in which the engine load is greater than or equal to the third predetermined load and the engine speed is less than the first predetermined speed, and the sixth region includes a region in which the engine load is greater than or equal to the third predetermined load and the engine speed is greater than or equal to the second predetermined speed.

The valve overlap may be limited by fixing the IVO timing and the IVC timing, and setting the EVC timing as a maximum value to maintain combustion stability in the first region.

The maximum duration may be maintained by retarding the EVC timing according to an increase of the engine load in the second region.

The IVC timing may be advanced to close to the BDC when the engine speed is less than or equal to a predetermined speed and may be advanced the BDC when the engine speed is greater than the predetermined speed in the third region.

The IVC timing may be approached to the BDC, and the IVO timing and the EVC timing may be approached to the TDC in the fourth region.

The EVC timing may be approached to the TDC to inhibit or prevent the valve overlap in the sixth region.

A system for controlling valve timing of a continuous variable valve duration engine provided with a turbo charger according to one form of the present disclosure may include: a data detector detecting data related to a running state of the vehicle; a camshaft position sensor detecting a position of a camshaft; an intake continuous variable valve duration (CVVD) device controlling an opening time of an intake valve of an engine; an exhaust continuous variable valve duration (CVVD) device controlling an opening time of an exhaust valve of the engine; an intake continuously variable valve timing (CVVT) device controlling an opening and closing timing of the intake valve of the engine; and a controller configured to classify a plurality of control regions depending on an engine speed and an engine load based on signals from the data detector and camshaft position sensor and configured to control the intake CVVD device, the exhaust CVVD device, and the intake CVVT device according to the control regions.

In particular, the a plurality of control regions includes: a first region when the engine load is less than a first predetermined load; a second region when the engine load is greater than or equal to the first predetermined load and less than a second predetermined load; a third region when the engine load is greater than or equal to the second predetermined load and less than a third predetermined load; a fourth region when the engine load is greater than or equal to the second predetermined load and the engine speed is greater than or equal to a first predetermined speed and less than a second predetermined speed; a fifth region when the engine load is greater than or equal to the third predetermined load and the engine speed is less than the first predetermined speed; and a sixth region when the engine load is greater than or equal to the third predetermined load and the engine speed is greater than or equal to the second predetermined speed, wherein the controller applies a maximum duration to an intake valve and controls an exhaust valve to limit a valve overlap in the first region, controls the intake valve and the exhaust valve to maintain the maximum duration in the second region, advances an intake valve closing (IVC) timing and an exhaust valve closing (EVC) timing by a predetermined angle in the third region, approaches the IVC timing to a bottom dead center (BDC) in the fourth region, controls a throttle valve to be fully opened and advances an intake valve opening (IVO) timing before a top dead center (TDC), and controls the IVC timing to be a predetermined value after the BDC in the fifth region, and controls the throttle valve to be fully opened and advances the IVC timing by a predetermined angle in the sixth region.

The controller may limit the valve overlap by fixing the IVO timing and the IVC timing, and setting the EVC timing as a maximum value to maintain combustion stability in the first region.

The controller may retard the EVC timing according to an increase of the engine load to maintain the overlap as the maximum value in the second region.

The controller may advance the IVC timing to close to the BDC when the engine speed is less than or equal to a predetermined speed and advance the IVC timing after the BDC when the engine speed is greater than the predetermined speed in the third region.

The controller may control the IVC timing to the BDC, and approach the IVO timing and the EVC timing to the TDC in the fourth region.

The controller may approach the EVC timing to the TDC to inhibit or prevent the valve overlap in the sixth region.

As described above, duration and timing of the continuous variable valve are simultaneously controlled, so the engine may be controlled under desired conditions.

That is, opening timing and closing timing of the intake valve and the exhaust valve are appropriately controlled, the fuel efficiency under a partial load condition and power performance under a high load condition are improved.

In addition, a starting fuel amount may be reduced by increasing a valid compression ratio, and exhaust gas may be reduced by shortening time for heating a catalyst.

In addition, by omitting the continuously variable valve timing device at the exhaust valve side, it is possible to reduce cost and avoid the problem of valve timing control.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4A-4C are drawings showing duration, opening timing, and closing timing of an intake valve depending on an engine load and an engine speed according to the present disclosure.

Figure 1:
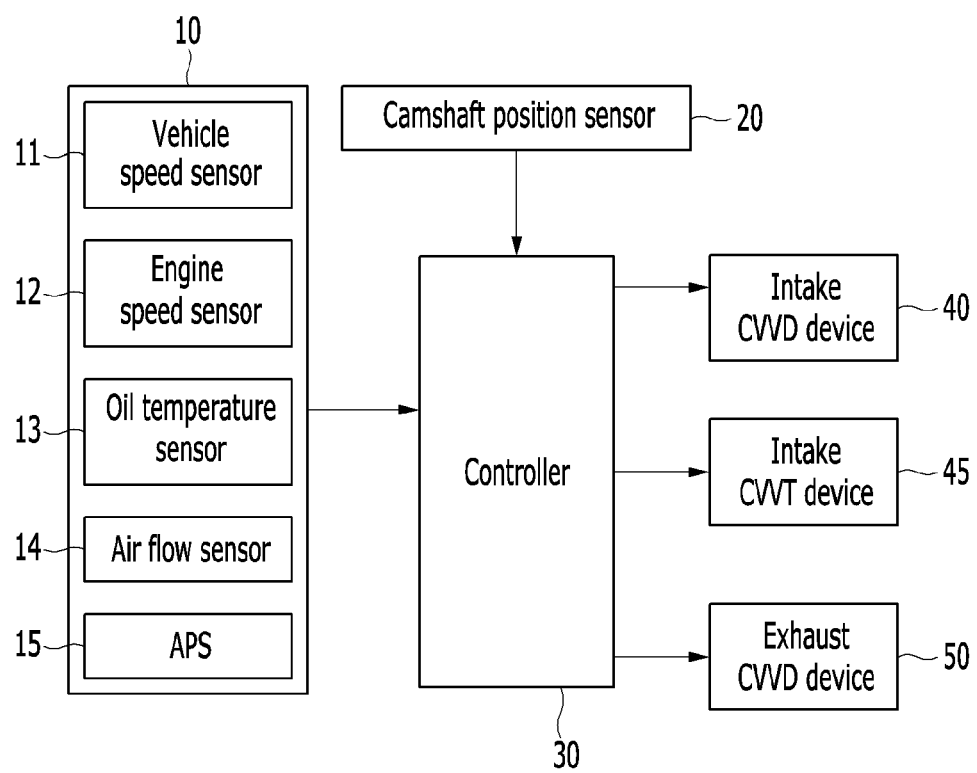
FIG. 1 is a schematic block diagram showing a system for controlling valve timing of a continuous variable valve duration engine according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

FIG. 1 is a schematic block diagram showing a system for controlling valve timing of a continuous variable valve duration engine according to one form of the present disclosure.

As shown in FIG. 1, a system for controlling valve timing of a continuous variable valve duration engine includes: a data detector 10, a camshaft position sensor 20, a controller 30, an intake continuous variable valve duration (CVVD) device 40, an intake continuous variable valve timing (CVVT) device 45, and an exhaust continuous variable valve duration (CVVD) device 50.

The data detector 10 detects data related to a running state of the vehicle for controlling the CVVD devices and the CVVT devices, and includes a vehicle speed sensor 11, an engine speed sensor 12, an oil temperature sensor 13, an air flow sensor 14, and an accelerator pedal position sensor (APS) 15, although other sensors or systems may be employed to detect or determine the desired data.

The vehicle speed sensor 11 detects a vehicle speed, transmits a corresponding signal to the controller 30, and may be mounted at a wheel of the vehicle.

The engine speed sensor 12 detects a rotation speed of the engine from a change in phase of a crankshaft or camshaft, and transmits a corresponding signal to the controller 30.

The oil temperature sensor (OTS) 13 detects temperature of oil flowing through an oil control valve (OCV), and transmits a corresponding signal to the controller 30.

The oil temperature detected by the oil temperature sensor 13 may be determined by measuring a coolant temperature using a coolant temperature sensor mounted at a coolant passage of an intake manifold. Therefore, in one form, the oil temperature sensor 13 may include a coolant temperature sensor, and the oil temperature should be understood to include the coolant temperature.

The air flow sensor 14 detects an air amount drawn into the intake manifold, and transmits a corresponding signal to the controller 30.

The accelerator pedal position sensor (APS) 15 detects a degree in which a driver pushes an accelerator pedal, and transmits a corresponding signal to the controller 30. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake passage may be used instead of the accelerator pedal position sensor 15. Therefore, in one form, the accelerator pedal position sensor 15 may include a throttle valve position sensor, and the position value of the accelerator pedal should be understood to include an opening value of the throttle valve.

The camshaft position sensor 20 detects a change of a camshaft angle, and transmits a corresponding signal to the controller 30.

Figure 2:
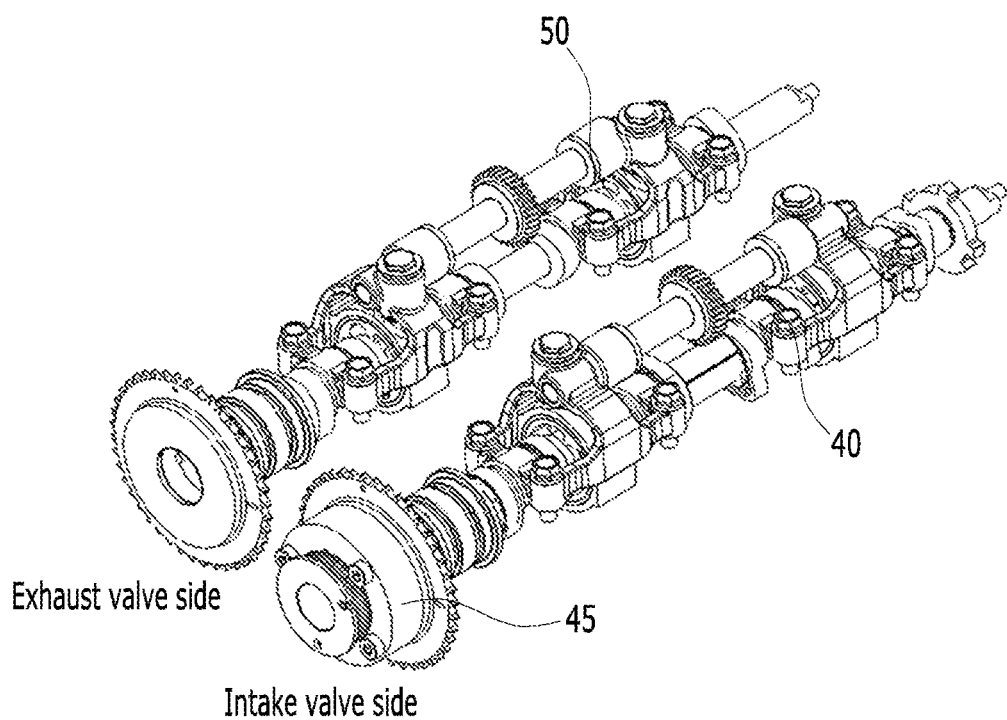
FIG. 2 is a perspective view showing a continuous variable valve duration device and a continuous variable valve timing device which are disposed on an intake valve side, and a continuous variable valve duration device disposed on an exhaust valve side according to one form of the present disclosure.

Referring to FIG. 2, a continuous variable valve duration device and a continuous variable valve timing device are mounted on the intake valve side, and the continuous variable valve duration device is mounted on the exhaust valve side through a fixed opening device. Therefore, an exhaust valve opening (EVO) timing is fixed in the one form of the present disclosure. For example, the EVO timing may be fixed at an angle a before bottom dead center of approximately 40 to 50 degrees at most of part load regions so as to be advantageous fuel efficiency.

The intake continuous variable valve duration (CVVD) device 40 controls an intake valve opening duration of the engine according to a signal of the controller 30, and the exhaust continuous variable valve duration (CVVD) device 50 controls an exhaust valve opening duration of the engine according to a signal of the controller 30.

The intake continuously variable valve timing (CVVT) device 45 controls opening and closing timing of the intake valve according to a signal of the controller 30.

The controller 30 may classify a plurality of control regions depending on an engine speed and an engine load based on signals from the data detector 10 and camshaft position sensor 20, and control the intake CVVD device 40, the exhaust CVVD device 50 and the intake CVVT device 45. Herein, the plurality of control regions may be classified into six regions.

The controller 30 may apply a maximum duration to the intake valve and control to limit a valve overlap by using the exhaust valve in a first region, apply the maximum duration to the intake and exhaust valves in a second region, and advance an intake valve closing (IVC) timing and exhaust valve closing (EVC) timing in the third region. And the controller 30 may approach the intake valve closing (IVC) timing to a bottom dead center (BDC) in a fourth region, control a wide open throttle valve (WOT) and advance an intake valve opening (IVO) timing before a top dead center (TDC) and control an intake valve closing (IVC) timing after the bottom dead center (BDC) in a fifth region, and control a wide open throttle valve (WOT) and advance an intake valve closing (IVC) timing in a sixth region.

For these purposes, the controller 30 may be implemented as at least one processor that is operated by a predetermined program, and the predetermined program may be programmed in order to perform each step of a method for controlling valve timing of a continuous variable valve duration engine according to one form of the present disclosure.

Various forms described herein may be implemented within a recording medium that may be read by a computer or a similar device by using software, hardware, or a combination thereof, for example.

The hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

The software such as procedures and functions of the forms described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 3A to FIG. 5C.

Figure 3A:
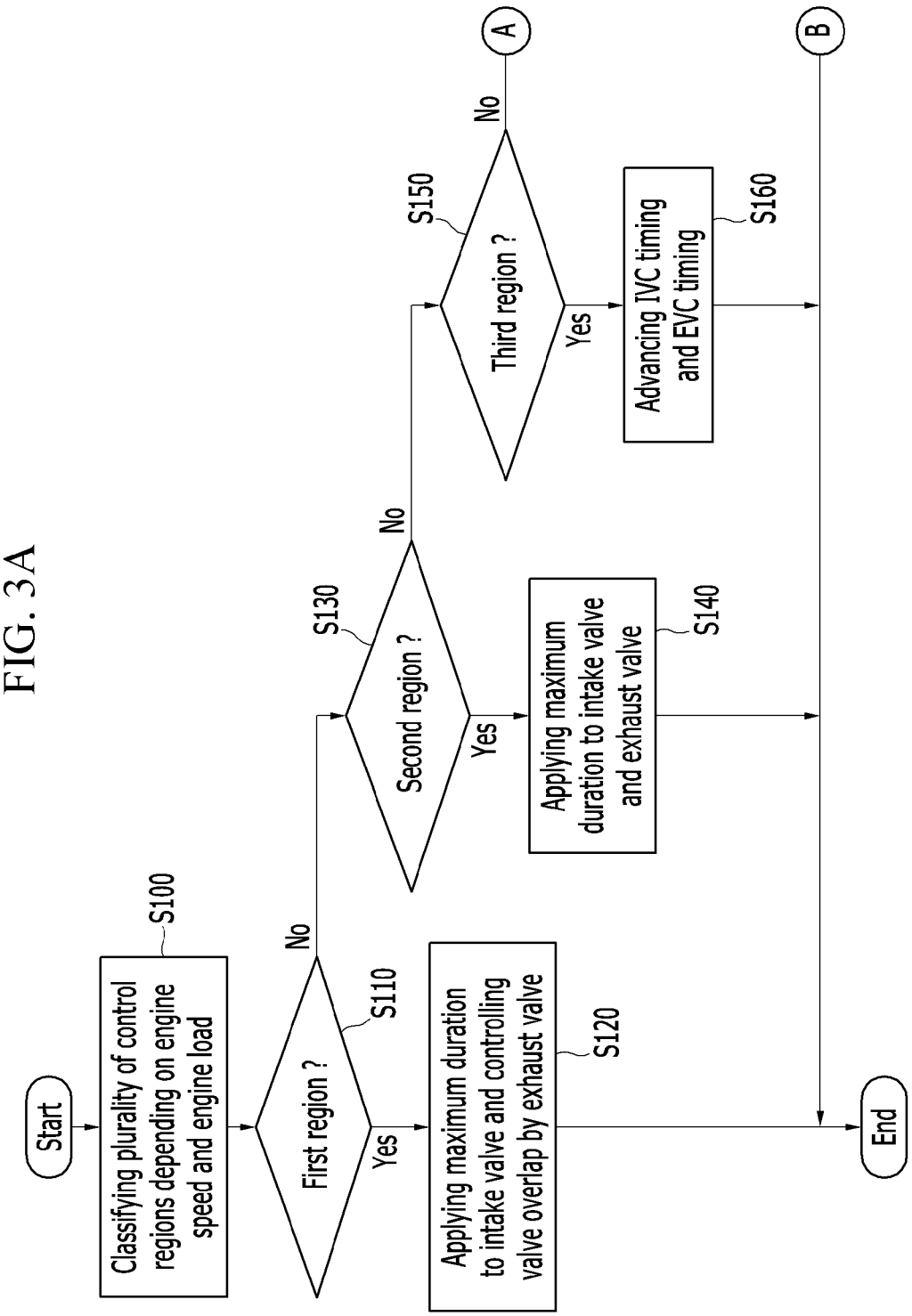
FIG. 3A and FIG. 3B are flowcharts showing a method for controlling valve timing of a continuous variable valve duration engine according to one form of the present disclosure.
Figure 3B:
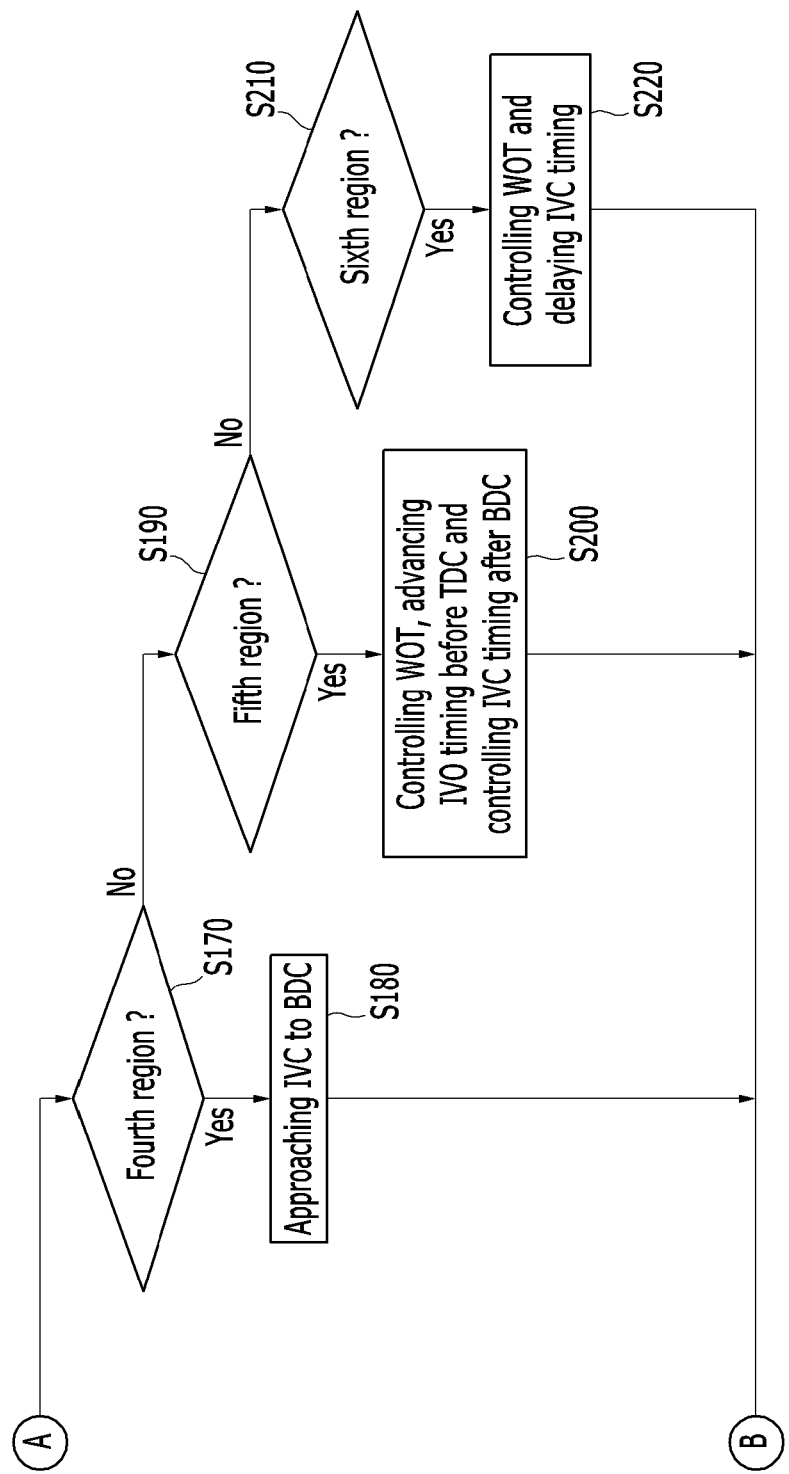
Figure 5A:
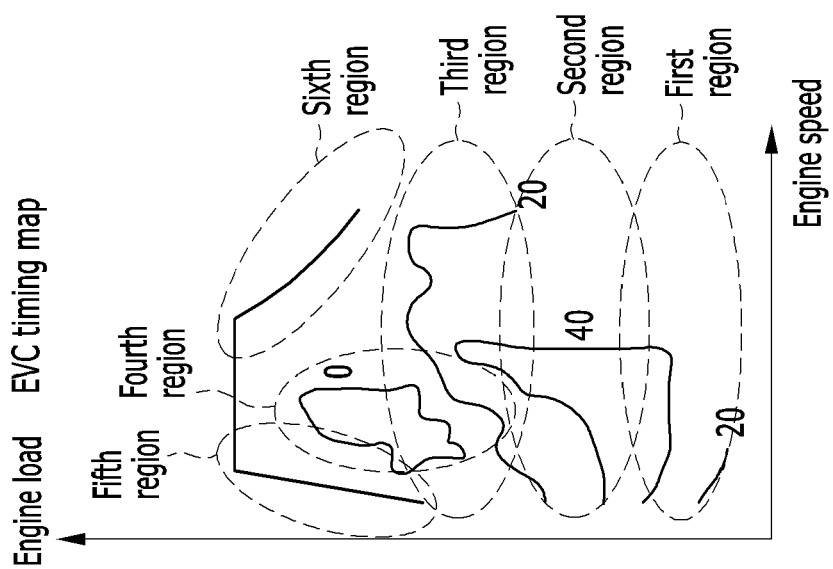
FIGS. 5A-5C are drawings showing duration, opening timing, and closing timing of an exhaust valve depending on an engine load and an engine speed according to the present disclosure.
Figure 5B:
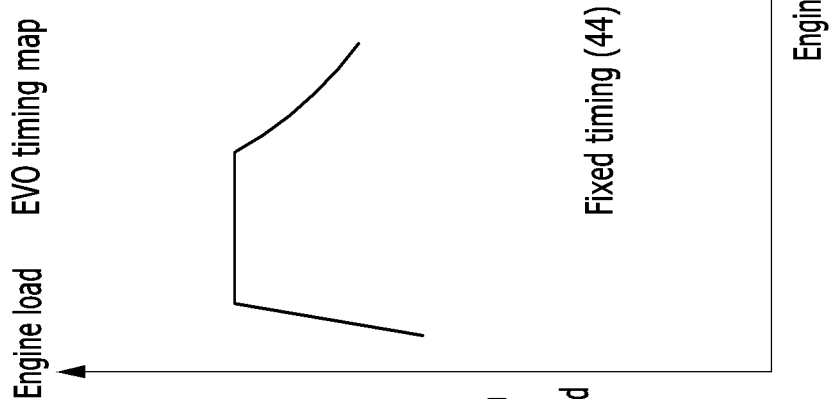
Figure 5C:
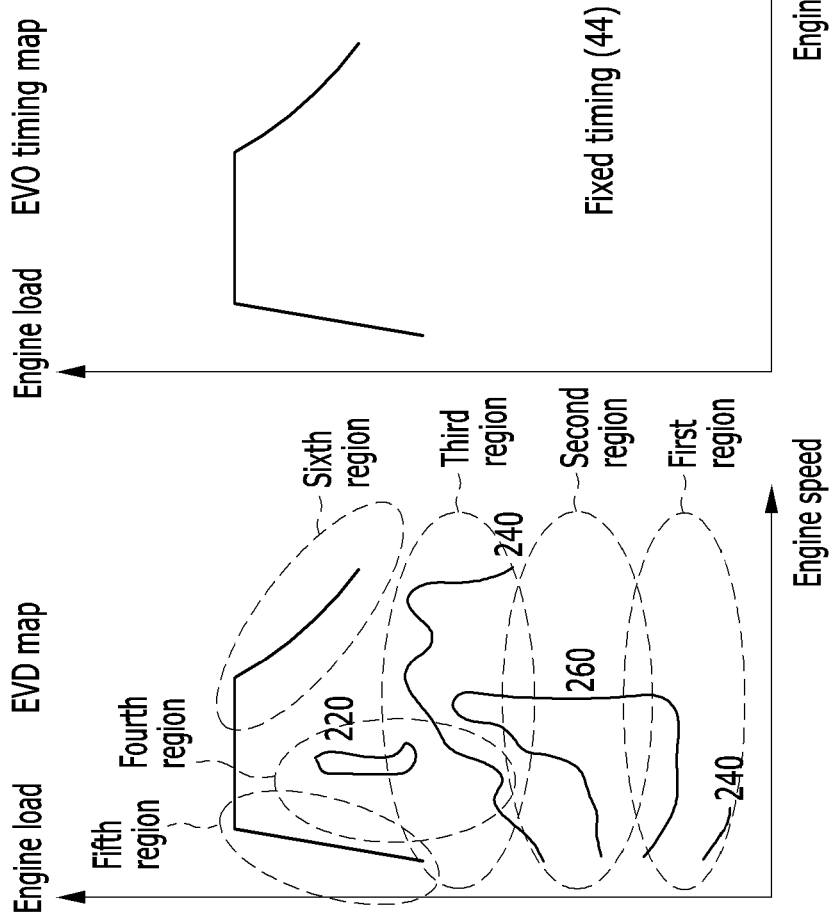

FIG. 3A and FIG. 3B are flowcharts showing a method for controlling valve timing of a continuous variable valve duration engine. In addition, FIGS. 4A-4C are drawings showing duration, opening timing, and closing timing of an intake valve depending on an engine load and an engine speed, and FIGS. 5A-5C are drawings showing duration, opening timing, and closing timing of an exhaust valve depending on an engine load and an engine speed.

In the FIGS. 4A-4C and FIGS. 5A-5C, an IVD map and an EVD map indicate a crank angle, an IVO timing map indicates an angle before a top dead center, an IVC timing map indicates an angle after a bottom dead center, an EVO timing map indicates an angle before a bottom dead center, and an EVC timing map indicates an angle after a top dead center.

As shown in FIG. 3A and FIG. 3B, a method for controlling valve timing of a continuous variable valve duration engine starts with classifying a plurality of control regions depending on an engine speed and an engine load by the controller 30 at step S100.

The controller 30 may classify control regions as a first region when the engine load is less than a first predetermined load, a second region when the engine load is greater than or equal to the first predetermined load and less than a second predetermined load, and a third region when the engine load is greater than or equal to the second predetermined load and less than a third predetermined load. In addition, the controller 30 may classify control regions as a fourth region when the engine load is greater than or equal to the second predetermined load and the engine speed is greater than or equal to a first predetermined speed and less than a second predetermined speed, a fifth region when the engine load is greater than or equal to the third predetermined load and the engine speed is less than the first predetermined speed, and a sixth region when the engine load is greater than or equal to the third predetermined load and the engine speed is greater than or equal to the second predetermined speed.

Meanwhile, referring to FIGS. 4A-4C and FIGS. 5A-5C, a crank angle is marked in an intake valve duration (IVD) map and an exhaust valve duration (EVD) map, which indicating the opening time of the intake valve and exhaust valve. For example, regarding the IVD map in the FIG. 4A, a curved line written as a number 200 at inner side of the fourth region means that the crank angle is approximately 200 degrees, a curved lined marked as a number 220 at outer side of the number 200 means that the crank angle is approximately 220 degrees. Although not shown in the drawing, the crank angle which is more than approximately 200 degrees and less than approximately 220 degrees is positioned between the curved line of the number 200 and the curved line of the number 220.

In addition, a unit of number designated in an intake valve opening (IVO) timing map is before a top dead center (TDC), a unit of number designated in an intake valve closing (IVC) timing map is after a bottom dead center (BDC), a unit of number designated in an exhaust valve opening (EVO) timing map is before BDC, and a unit of number designated in an exhaust valve closing (EVC) map is after TDC.

Each region and curved line in the FIGS. 4A-4C and FIGS. 5A-5C are an exemplary form of the present disclosure, it may be modified within the technical idea and scope of the present disclosure.

Referring to FIG. 3A to FIG. 5C, the control regions are classified according to the engine speed and load in the step of S100. After that, the controller 30 determines whether the engine state is under the first region at step S110.

In the step of S110, if the engine load is less than a first predetermined load, the controller 30 determines that the engine state is under the first region. At this time, the controller 30 applies a maximum duration to the intake valve and controls the valve overlap between the exhaust valve and intake valve at step S120. The valve overlap is a state where the intake valve is opened and the exhaust valve is not closed yet.

In other words, when the engine is under low load, then the controller 30 may control both the intake valve opening (IVO) timing and the intake valve closing (IVC) timing being fixed such that the intake valve has a maximum duration value.

As shown in FIGS. 4A-4C, the first region may be fixed approximately 0 to 10 degrees before TDC in the IVO timing map and fixed approximately 100 to 110 degrees after BDC in the IVC timing map.

In addition, the controller 30 may limit the overlap by setting the EVC timing as a maximum value to maintain combustion stability.

When the current engine state does not belong to the first region at the step S110, the controller 30 determines whether the current engine state belongs to the second region at step S130.

When the current engine state belongs to the second region at the step S130, the controller 30 controls the intake valve and the exhaust valve to maintain the maximum duration at step S140.

The controller 30 may maintain the maximum duration of the exhaust valve by retarding the EVC timing as the engine load increases. Herein, the controller 30 may use the maximum duration of the exhaust by fixing the IVO timing and the IVC timing with the maximum duration of the intake used in the first region.

Meanwhile, a manifold absolute pressure (MAP) of the intake which is a pressure difference between atmospheric pressure and pressure of the intake manifold should be constantly maintained in the natural aspirated engine, on the contrary, it may not need to control in the turbo engine according to one form of the present disclosure because pressure of the intake manifold is greater than atmospheric pressure due to boost.

When the current engine state does not belong to the second region at the step S130, the controller 30 determines whether the current engine state belongs to the third region at step S150.

When the current engine state belongs to the third region at the step S150, the controller 30 advances the IVC timing and the EVC timing at step S160.

Since the IVC timing is controlled at the LIVC position (for example, an angle approximately 100-110 of degrees after a bottom dead center) in the first and second regions, knocking may be generated as the engine load is increased. Accordingly, fuel efficiency may be deteriorated as boost pressure is increased and knocking is deteriorated. In order to inhibit or prevent effect as described above, the controller 30 advances the IVC timing.

At this time, as shown in FIGS. 4A-4C, the controller 30 may rapidly advance the IVC timing close to a bottom dead center when the engine speed is less than or equal to a predetermined speed, and may slowly advance the IVC timing at an angle of approximately 30 to 50 degrees after the bottom dead center when the engine speed is greater than the predetermined speed so as to reflect characteristic of the turbo engine. The predetermined speed may be approximately 1500 rpm.

In addition, as shown in FIGS. 5A-5C, the controller 30 may advance the EVC timing close to a top dead center since the EVC timing is positioned at the maximum value of the overlap in the first and second regions.

When the current engine state does not belong to the third region at the step S150, the controller 30 determines whether the current engine state belongs to the fourth region at step S170.

If the engine state is under the fourth region in the S170, the controller 30 controls the IVC timing close to the BDC at step S180.

The fourth region may be a low boost region that the engine load is greater than or equal to the second predetermined load and the engine speed is greater than or equal to the first predetermined speed and less than the second predetermined speed. For example, the first predetermined speed may be approximately 1500 rpm, and the second predetermined speed may be approximately 2500 rpm.

The controller 30 controls the IVC timing close to BDC in the fourth region, thereby improving fuel efficiency. In addition, the controller 30 may inhibit or prevent the overlap by controlling the IVO timing and the EVC timing close to top dead center. Accordingly, a short intake duration (e.g., approximately 180 degrees) may be used in the fourth region.

When the current engine state does not belong to the fourth region at the step S170, the controller 30 determines whether the current engine state belongs to the fifth region at step S190.

When the current engine state belongs to the fifth region at the step S190, the controller 30 fully opens a throttle valve, advances the IVO timing before the TDC and controls the IVC timing after the BDC at step S200.

In the turbo engine, if the throttle valve is controlled to be wide open (WOT) when the engine speed is less than the first predetermined speed (e.g., approximately 1500 rpm), intake port pressure becomes higher than exhaust port pressure by boosting. Therefore, effect of a scavenging phenomenon which emits combustion gas of the exhaust is prominent in the turbo engine compared to a natural aspirated engine. Accordingly, as shown in FIGS. 4A-4C, the controller 30 may advance the IVO timing at an angle of approximately 20 to 40 degrees before the TDC to generate the scavenging, and control the IVC timing at angle of approximately 0 to 20 degrees after the BDC.

Although the EVO timing is retarded after the BDC in order to increase the scavenging phenomenon through exhaust interference reduction, the EVO timing is fixed before the BDC in one form of the present disclosure. Accordingly, the present disclosure may be appropriate for a three-cylinder engine insignificantly influenced by the exhaust interference than a four-cylinder greatly influenced by the exhaust interference.

When the current engine state does not belong to the fifth region at the step S190, the controller 30 determines whether the current engine state belongs to the sixth region at step S210.

When the current engine state belongs to the sixth region at the step S210, the controller 30 fully opens a throttle valve and advances the IVC timing at step S220.

When the engine speed is greater than the second predetermined speed (e.g., approximately 2500 rpm) in the sixth region, the scavenging phenomenon disappears because exhaust port pressure is much higher than intake port pressure. In this case, since the EVO timing is fixed to increase the exhaust pumping, the valve overlap can be inhibited or prevented by approaching the EVC timing to the TDC, as shown in FIGS. 5A-5C.

Meanwhile, when WOT control is performed at a high speed condition, the knocking is rarely generated in the natural aspiration engine, on the contrary, the knocking may be deteriorated in the turbo engine. Thus, as shown in FIGS. 4A-4C, the controller 30 may advance the IVC timing within an angle of approximately 50 degrees after BDC to reduce knocking by decreasing boost pressure.

As described above, according to the present disclosure, duration and timing of the continuous variable valve are simultaneously controlled, so the engine may be controlled under desired conditions.

That is, since opening timing and closing timing of the intake valve and the exhaust valve are appropriately controlled, the fuel efficiency under a partial load condition and engine performance under a high load condition are improved. In addition, a starting fuel amount may be reduced by increasing a valid compression ratio, and exhaust gas may be reduced by shortening time for heating a catalyst.

In addition, by omitting the continuously variable valve timing device at the exhaust valve side, it is possible to reduce cost and avoid the problem of valve timing control.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A method for controlling valve timing of a turbo engine provided with a continuous variable valve duration (CVVD) device and a continuous variable valve timing (CVVT) device at an intake valve side and a continuous variable valve duration (CVVD) device at an exhaust valve side, the method comprising:
   classifying, by a controller, a plurality of control regions depending on an engine speed and an engine load;
   applying, by the controller, a maximum duration to an intake valve and controlling an exhaust valve to limit a valve overlap in a first region;
   controlling, by the controller, the intake valve and the exhaust valve to maintain the maximum duration in a second region;
   advancing, by the controller, an intake valve closing (IVC) timing and an exhaust valve closing (EVC) timing by a predetermined angle in a third region;
   approaching, by the controller, the IVC timing to a bottom dead center (BDC) in a fourth region;

controlling, by the controller, a throttle valve to be fully opened, advancing an intake valve opening (IVO) timing before a top dead center (TDC) and controlling the IVC timing to be a predetermined value after the BDC in a fifth region; and controlling, by the controller, the throttle valve to be fully opened and advancing the IVC timing by a predetermined angle in a sixth region, wherein the first region includes a region in which an engine load is less than a first predetermined load, the second region includes a region in which the engine load is greater than or equal to the first predetermined load and less than a second predetermined load, the third region includes a region in which the engine load is greater than or equal to the second predetermined load and less than a third predetermined load, the fourth region includes a region in which the engine load is greater than or equal to the second predetermined load and the engine speed is greater than or equal to a first predetermined speed and less than a second predetermined speed, the fifth region includes a region in which the engine load is greater than or equal to the third predetermined load and the engine speed is less than the first predetermined speed, and the sixth region includes a region in which the engine load is greater than or equal to the third predetermined load and the engine speed is greater than or equal to the second predetermined speed.

2. The method of claim 1, wherein the valve overlap is limited by fixing the IVO timing and the IVC timing, and by setting the EVC timing as a maximum value to maintain combustion stability in the first region.

3. The method of claim 1, wherein the maximum duration is maintained by retarding the EVC timing according to an increase of the engine load in the second region.

4. The method of claim 1, wherein the IVC timing is advanced to close to the BDC when the engine speed is less than or equal to a predetermined speed and is advanced after the BDC when the engine speed is greater than the predetermined speed in the third region.

5. The method of claim 1, wherein the IVC timing is approached to the BDC, and the IVO timing and the EVC timing are approached to the TDC in the fourth region.

6. The method of claim 1, wherein the EVC timing is approached to the TDC to inhibit the valve overlap in the sixth region.

7. A system for controlling valve timing of a continuous variable valve duration engine provided with a turbo charger, the system comprising:

a data detector configured to detect data related to a running state of a vehicle;

a camshaft position sensor configured to detect a position of a camshaft;

an intake continuous variable valve duration (CVVD) device configured to control an opening time of an intake valve of an engine;

an exhaust continuous variable valve duration (CVVD) device configured to control an opening time of an exhaust valve of the engine;

an intake continuously variable valve timing (CVVT) device configured to control an opening and closing timing of the intake valve of the engine; and a controller configured to classify a plurality of control regions depending on an engine speed and an engine load based on signals from the data detector and camshaft position sensor, and configured to control the intake CVVD device, the exhaust CVVD device, and the intake CVVT device according to the control regions, wherein the control regions includes:

a first control region determined by the controller when the engine load is less than a first predetermined load, a second control region determined by the controller when the engine load is greater than or equal to the first predetermined load and less than a second predetermined load, a third control region determined by the controller when the engine load is greater than or equal to the second predetermined load and less than a third predetermined load, a fourth control region determined by the controller when the engine load is greater than or equal to the second predetermined load and the engine speed is greater than or equal to a first predetermined speed and less than a second predetermined speed, a fifth control region determined by the controller when the engine load is greater than or equal to the third predetermined load and the engine speed is less than the first predetermined speed, and a sixth control region determined by the controller when the engine load is greater than or equal to the third predetermined load and the engine speed is greater than or equal to the second predetermined speed, and wherein the controller applies a maximum duration to the intake valve and controls the exhaust valve to limit a valve overlap in the first region, controls the intake valve and the exhaust valve to maintain the maximum duration in the second region, advances an intake valve closing (IVC) timing and an exhaust valve closing (EVC) timing by a predetermined angle in the third region, approaches the IVC timing to a bottom dead center (BDC) in the fourth region, controls a throttle valve to be fully opened and advances an intake valve opening (IVO) timing before a top dead center (TDC), and controls the IVC timing to be a predetermined value after the BDC in the fifth region, and controls the throttle valve to be fully opened and advances the IVC timing by a predetermined angle in the sixth region.

8. The system of claim 7, wherein the controller limits the valve overlap by fixing the IVO timing and the IVC timing, and by setting the EVC timing as a maximum value to maintain combustion stability in the first region.

9. The system of claim 7, wherein the controller retards the EVC timing according to an increase of the engine load to maintain the valve overlap as a maximum value in the second region.

10. The system of claim 7, wherein the controller advances the IVC timing to close to the BDC when the engine speed is less than or equal to a predetermined speed and advances the IVC timing after the BDC when the engine speed is greater than the predetermined speed in the third region.

11. The system of claim 7, wherein the controller controls the IVC timing to the BDC, and approaches the IVO timing and the EVC timing to the TDC in the fourth region.

12. The system of claim 7, wherein the controller approaches the EVC timing to the TDC to inhibit the valve overlap in the sixth region.

* * * * *